(12) United States Patent
Mantell

(10) Patent No.: US 8,764,151 B2
(45) Date of Patent: Jul. 1, 2014

(54) SYSTEM AND METHOD FOR PRESERVING EDGES WHILE ENABLING INKJET CORRECTION WITHIN AN INTERIOR OF AN IMAGE

(75) Inventor: David Allen Mantell, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 355 days.

(21) Appl. No.: 12/819,710

(22) Filed: Jun. 21, 2010

(65) Prior Publication Data

US 2011/0310154 A1  Dec. 22, 2011

(51) Int. Cl.
  *B41J 2/205* (2006.01)
  *B41J 2/195* (2006.01)

(52) U.S. Cl.
  USPC .......................................................... 347/15

(58) Field of Classification Search
  USPC .......................................................... 347/15
  See application file for complete search history.

(56) References Cited

U.S. PATENT DOCUMENTS

| | | | |
|---|---|---|---|
| 4,517,579 A * | 5/1985 | Kitamura | 347/133 |
| 5,347,374 A | 9/1994 | Fuss et al. | |
| 5,434,672 A | 7/1995 | McGuire | |
| 5,521,620 A | 5/1996 | Becerra et al. | |
| 5,602,572 A * | 2/1997 | Rylander | 358/3.09 |
| 5,633,662 A * | 5/1997 | Allen et al. | 347/15 |
| 5,706,414 A * | 1/1998 | Pritchard | 358/1.18 |
| 5,777,656 A | 7/1998 | Henderson | |
| 5,835,233 A * | 11/1998 | Otsu et al. | 358/3.27 |
| 5,847,724 A | 12/1998 | Mantell | |
| 5,860,047 A * | 1/1999 | Hernandez | 399/181 |
| 5,872,897 A * | 2/1999 | Jones et al. | 358/1.9 |
| 5,933,539 A | 8/1999 | Metcalfe et al. | |
| 6,161,919 A | 12/2000 | Klassen | |
| 6,259,821 B1 | 7/2001 | Branciforte et al. | |
| 6,606,420 B1 * | 8/2003 | Loce et al. | 382/266 |
| 6,751,358 B1 | 6/2004 | Mantell et al. | |
| 6,753,976 B1 | 6/2004 | Torpey et al. | |
| 6,791,714 B1 * | 9/2004 | Ishimura | 358/1.9 |
| 6,806,980 B2 | 10/2004 | Xu et al. | |
| 6,819,452 B1 * | 11/2004 | Richtsmeier et al. | 358/1.9 |
| 6,829,064 B1 * | 12/2004 | Yu et al. | 358/3.15 |
| 6,868,180 B2 | 3/2005 | Akahori et al. | |
| 6,880,907 B2 | 4/2005 | Tsai | |
| 6,970,258 B1 * | 11/2005 | Meyer et al. | 358/1.11 |
| 7,023,578 B2 | 4/2006 | Hayes et al. | |
| 7,095,530 B2 | 8/2006 | Mantell et al. | |
| 7,262,885 B2 | 8/2007 | Yao | |
| 7,364,254 B2 * | 4/2008 | Yamazaki et al. | 347/23 |
| 7,639,956 B2 * | 12/2009 | Naito et al. | 399/26 |
| 7,692,804 B2 * | 4/2010 | Naito et al. | 358/1.13 |
| 7,697,169 B2 * | 4/2010 | Keithley et al. | 358/3.27 |
| 7,990,579 B2 * | 8/2011 | Misaizu et al. | 358/2.1 |
| 8,089,639 B2 * | 1/2012 | Kimakura | 358/1.11 |
| 2003/0053161 A1 | 3/2003 | Li et al. | |
| 2003/0169442 A1 | 9/2003 | Yokochi | |
| 2003/0218780 A1 | 11/2003 | Braun et al. | |

(Continued)

*Primary Examiner* — Alessandro Amari
*Assistant Examiner* — Jeremy Bishop
(74) *Attorney, Agent, or Firm* — Maginot, Moore & Beck, LLP

(57) ABSTRACT

A method for image correction preserves edges in image data stored in a printing system. The method identifies edge image data values within a plurality of image data values and excludes the identified edge image data values from the dithering of the image data values.

14 Claims, 3 Drawing Sheets

(56) References Cited

U.S. PATENT DOCUMENTS

| | | |
|---|---|---|
| 2006/0007497 A1 | 1/2006 | Yokochi |
| 2006/0098251 A1 | 5/2006 | Eklund et al. |
| 2006/0285131 A1 | 12/2006 | Mantell et al. |
| 2006/0285134 A1 | 12/2006 | Viturro et al. |
| 2007/0070427 A1* | 3/2007 | Cooper et al. ............... 358/3.14 |
| 2007/0273927 A1 | 11/2007 | Misaizu et al. |

* cited by examiner

SYSTEM AND METHOD FOR PRESERVING EDGES WHILE ENABLING INKJET CORRECTION WITHIN AN INTERIOR OF AN IMAGE

TECHNICAL FIELD

This disclosure relates generally to imaging devices that eject ink from inkjets onto an image substrate and, more particularly, to imaging devices that detect inkjets in a printhead that are unable to eject ink to form a pixel on an image receiving member.

BACKGROUND

Drop on demand inkjet technology for producing printed media has been employed in commercial products such as printers, plotters, and facsimile machines. Generally, an inkjet image is formed by selectively ejecting ink drops from a plurality of drop generators or inkjets, which are arranged in a printhead or a printhead assembly, onto an image substrate. For example, the printhead assembly and the image substrate are moved relative to one other and the inkjets are operated to eject ink drops onto the image substrate at appropriate times. The timing of the inkjet activation is performed by a printhead controller, which generates firing signals that activate the inkjets to eject ink. The image substrate may be an intermediate image member, such as a print drum or belt, from which the ink image is later transferred to a print medium, such as paper. The image substrate may also be a moving web of print medium or a series of print medium sheets onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form that is delivered to a melting device, which heats the solid ink to its melting temperature to generate liquid ink that is supplied to a print head.

During the operational life of these imaging devices, inkjets in one or more printheads may become unable to eject ink in response to a firing signal. The defective condition of the inkjet may be temporary and the inkjet may return to operational status after one or more image printing cycles. In other cases, the inkjet may not be able to eject ink until a purge cycle is performed. A purge cycle may successfully unclog inkjets so they are able to eject ink once again. Execution of a purge cycle, however, requires the imaging device to be taken out of its image generating mode. Thus, purge cycles affect the throughput rate of an imaging device and are preferably performed during periods in which the imaging device is not generating images.

Methods have been developed that enable an imaging device to generate images even though one or more inkjets in the imaging device are unable to eject ink. These methods cooperate with image rendering methods to control the generation of firing signals for inkjets in a printhead. Rendering refers to the processes that receive input image data values and then generate output image values. The output image values are used to generate firing signals for a printhead to cause the inkjets to eject ink onto the recording media. Once the output image values are generated, a method may use information regarding defective inkjets detected in a printhead to identify the output image values that correspond to a defective inkjet in a printhead. The method then searches to find a neighboring or nearby output image value that can be adjusted to compensate for the defective inkjet. Preferably, an increase in the amount of ink ejected near the defective inkjet may be achieved by replacing a zero or nearly zero output image value with the output image value that corresponds to the defective inkjet. Another method increases neighboring or nearby output image values to boost the amount of ink to be ejected by a plurality of inkjets in the vicinity of the defective inkjet. Another method is able to compensate for the defective inkjet because a normalization process may be used to establish a maximum output image value for inkjets that is less than the output value that causes an inkjet to eject the maximum amount of ink that can be ejected by an inkjet. Thus, an output image value can be increased beyond the normalized maximum output image value to enable an inkjet to eject an amount of ink corresponding to the maximum output value plus some incremental amount. By firing several nearby inkjets in this manner, the ejected ink density can approximate the ink mass that would have been ejected had the defective inkjet been able to eject the ink for a missing pixel.

The previously known methods for re-distributing the ink to be ejected by a defective inkjet to other neighboring or nearby inkjets are useful as long as the nearby inkjets and the defective inkjet are printing a generally uniform area at an ink mass that is less than the maximum ink mass that can be ejected by an inkjet. In order to preserve the ability to increase the amount of ink ejected by an inkjet in the vicinity of a missing, intermittent, or weak inkjet, some printers reduce solid uniform areas in an ink image to a predetermined maximum. That is, the ink drops for the image area are limited to an ink mass, such as 80% of full ink drop mass, to enable image data for inkjets in the vicinity of a missing, intermittent, or weak inkjet to be increased to a value that results in a firing signal that causes the inkjet to eject an ink drop that is 100% of the maximum ink drop size. Maintaining the ink drop size in an image area below the maximum ink drop mass is called "dithering." One issue that may arise when dithering is used is edge raggedness. The human eye is more sensitive to image defects at locations where contrast is significant, such as edges. Holes in an image at edges of objects, such as text, may significantly increase fuzziness that may arise when dithering is used for the object. Thus, preserving the ability to compensate for missing, intermittent, or weak inkjets without increasing raggedness at object edges is important in image processing.

SUMMARY

A system reduces the likelihood of raggedness at object edges while enabling dithering within the object for compensation of defective inkjets. The system includes an image data memory having a plurality of locations in which image data values are stored, and a processor configured to identify edge image data values in a plurality of image data values stored in the image data memory, to exclude the identified edge image data values from dithering of the image data values stored in the image data memory, to generate firing signals corresponding to the image data values stored in the image data memory, and to operate a printhead with the generated firing signals.

A method implemented in the system reduces the likelihood of raggedness at object edges while enabling dithering within the object for compensation of defective inkjets. The method includes identifying edge image data values in a plurality of image data values stored in a memory, excluding the identified edge image data values from dithering of the image data values stored in the memory, generating firing signals corresponding to the image data values stored in the memory, and operating a printhead with the generated firing signals.

BRIEF DESCRIPTION OF THE DRAWINGS

The foregoing aspects and other features of a printer that reduces the likelihood of raggedness at object edges while enabling dithering within the object for compensation of defective inkjets are explained in the following description, taken in connection with the accompanying drawings.

DETAILED DESCRIPTION

Figure 1:
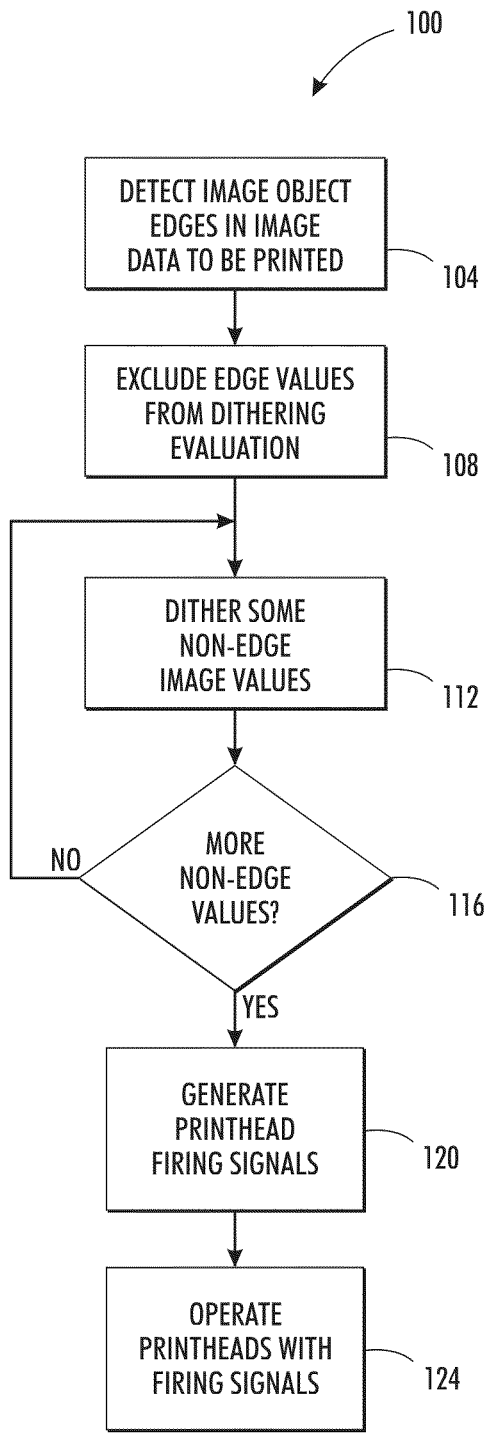
FIG. 1 is a flow diagram of a process for detecting edges in image data and preserving the image data values located at an edge.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, etc. Also, the description presented below is directed to a system for operating a printer that forms images on a moving web driven by rollers. Also, the word "component" refers to a device or subsystem in the web printing system that is operated by a controller in the web printing system to condition the web, print the web, or move the web through the web printing system. A "process direction" refers to a direction of relative motion between an imaging member and an image substrate in a printer during a print imaging operation. A "cross-process direction" is a perpendicular direction from the process direction along the surface of the imaging member. As used in this document, "identify" and "calculate" include the operation of a circuit comprised of hardware, software, or a combination of hardware and software that reaches a result based on one or more measurements of physical relationships with accuracy or precision suitable for a practical application. As used in this document, "dithered" image data is image data that is limited to a pre-determined image data value that is less than 100 percent of the image data value that causes ink drops to be ejected by an inkjet ejector.

Figure 4:
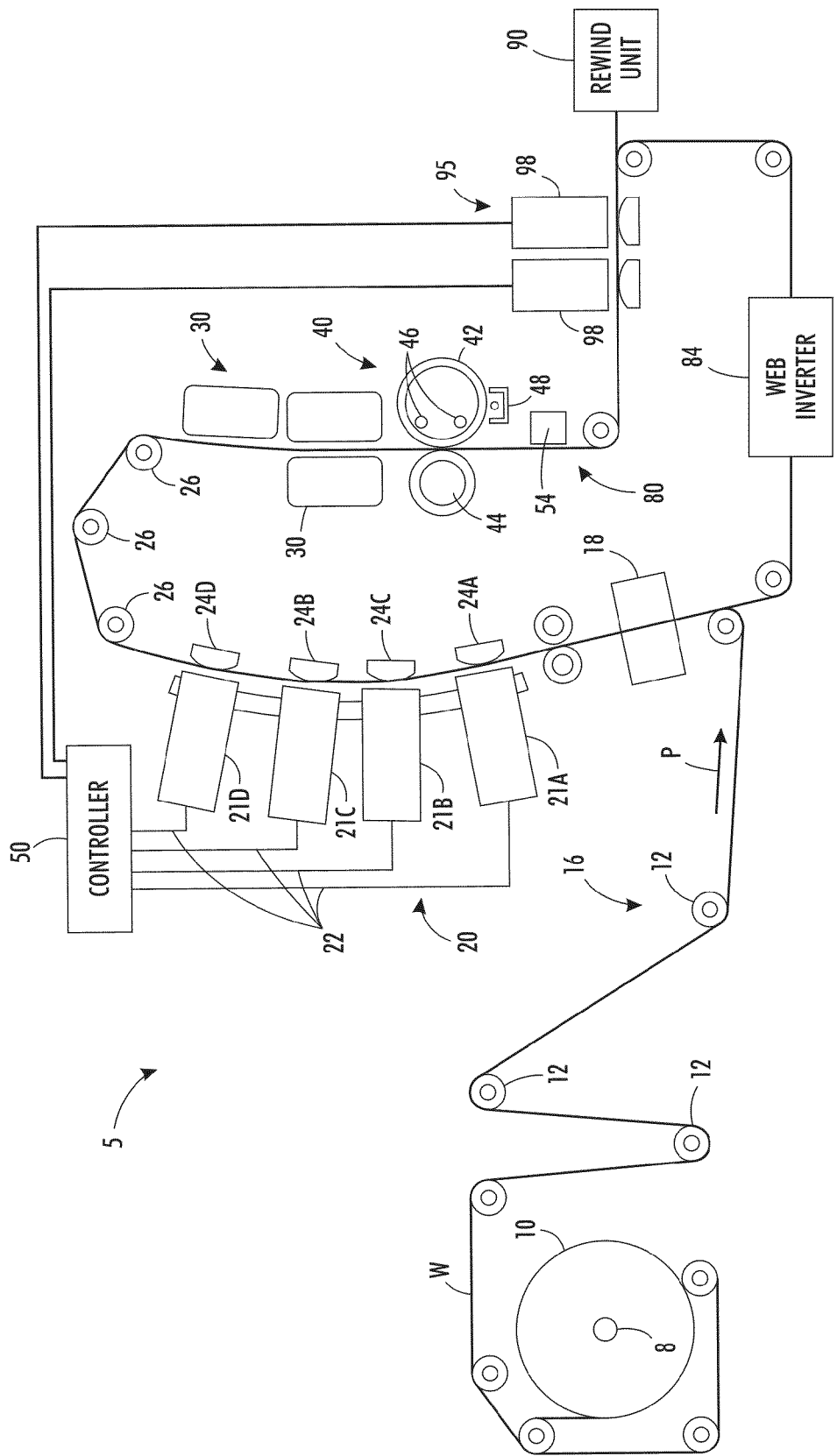
FIG. 4 is a schematic view of an improved inkjet imaging system that increases image data values corresponding to edges to preserve the edges better in dithered image data.

FIG. 4 depicts an imaging apparatus 5 that implements a solid ink print process for printing onto a continuous media web. Although the system and method disclosed herein are most beneficial in imaging systems in which the recording media passes the printheads only once, they may be used in imaging systems in which multiple passes occur to form an image. Also, while the system and method are discussed in the context of a solid ink printer, they may be used with systems that use other types of liquid ink, such as aqueous, emulsified, gel, or UV curable inks.

Referring to FIG. 4, an inkjet imaging system 5 is shown. For the purposes of this disclosure, the imaging apparatus is in the form of an inkjet printer that employs one or more inkjet printheads and an associated solid ink supply. The controller, discussed in more detail below, may be configured to implement the printing processes discussed within this document with the system 5 as described herein. The printing methods described herein are applicable to any of a variety of other imaging apparatus that use inkjets to eject one or more colorants to a medium or media.

The imaging apparatus 5 includes a print engine to process the image data before generating the control signals for the inkjet ejectors. The colorant may be ink, or any suitable substance that includes one or more dyes or pigments and that may be applied to the selected media. The colorant may be black, or any other desired color, and a given imaging apparatus may be capable of applying a plurality of distinct colorants to the media. The media may include any of a variety of substrates, including plain paper, coated paper, glossy paper, or transparencies, among others, and the media may be available in sheets, rolls, or another physical formats.

Direct-to-sheet, continuous-media, phase-change inkjet imaging system 5 includes a media supply and handling system configured to supply a long (i.e., substantially continuous) web of media W of "substrate" (paper, plastic, or other printable material) from a media source, such as spool of media 10 mounted on a web roller 8. For simplex printing, the printer is comprised of feed roller 8, media conditioner 16, printing station 20, printed web conditioner 80, coating station 95, and rewind unit 90. For duplex operations, the web inverter 84 is used to flip the web over to present a second side of the media to the printing station 20, printed web conditioner 80, and coating station 95 before being taken up by the rewind unit 90. In the simplex operation, the media source 10 has a width that substantially covers the width of the rollers over which the media travels through the printer. In duplex operation, the media source is approximately one-half of the roller widths as the web travels over one-half of the rollers in the printing station 20, printed web conditioner 80, and coating station 95 before being flipped by the inverter 84 and laterally displaced by a distance that enables the web to travel over the other half of the rollers opposite the printing station 20, printed web conditioner 80, and coating station 95 for the printing, conditioning, and coating, if necessary, of the reverse side of the web. The rewind unit 90 is configured to wind the web onto a roller for removal from the printer and subsequent processing.

The media may be unwound from the source 10 as needed and propelled by a variety of motors, not shown, rotating one or more rollers. The media conditioner includes rollers 12 and a pre-heater 18. The rollers 12 control the tension of the unwinding media as the media moves along a path through the printer. In alternative embodiments, the media may be transported along the path in cut sheet form in which case the media supply and handling system may include any suitable device or structure that enables the transport of cut media sheets along a desired path through the imaging device. The pre-heater 18 brings the web to an initial predetermined temperature that is selected for desired image characteristics corresponding to the type of media being printed as well as the type, colors, and number of inks being used. The pre-heater 18 may use contact, radiant, conductive, or convective heat to bring the media to a target preheat temperature, which in one practical embodiment, is in a range of about 30° C. to about 70° C.

The media is transported through a printing station 20 that includes a series of color units 21A, 21B, 21C, and 21D, each color unit effectively extending across the width of the media and being able to place ink directly (i.e., without use of an intermediate or offset member) onto the moving media. As is generally familiar, each of the printheads may eject a single color of ink, one for each of the colors typically used in color printing, namely, cyan, magenta, yellow, and black (CMYK). The controller 50 of the printer receives velocity data from encoders mounted proximately to rollers positioned on either side of the portion of the path opposite the four color units to calculate the linear velocity and position of the web as moves past the printheads. The controller 50 uses these data to generate timing signals for actuating the inkjet ejectors in the printheads to enable the four colors to be ejected with a reliable degree of accuracy for registration of the differently colored patterns to form four primary-color images on the media. The inkjet ejectors actuated by the firing signals corresponds to image data processed by the controller 50. The image data may be transmitted to the printer, generated by a scanner (not shown) that is a component of the printer, or otherwise generated and delivered to the printer. In various possible embodiments, a color unit for each primary color may include one or more printheads; multiple printheads in a color unit may be formed into a single row or multiple row array; printheads of a multiple row array may be staggered; a printhead may print more than one color; or the printheads or portions of a color unit may be mounted movably in a direction transverse to the process direction P, such as for spot-color applications and the like.

Each of color units 21A-21D includes at least one actuator configured to adjust the printheads in each of the printhead modules in the cross-process direction across the media web. In a typical embodiment, each motor is an electromechanical device such as a stepper motor or the like. In a practical embodiment, a print bar actuator is connected to a print bar containing two or more printheads. The print bar actuator is configured to reposition the print bar by sliding the print bar along the cross-process axis of the media web. Printhead actuators may also be connected to individual printheads within each of color units 21A-21D. These printhead actuators are configured to reposition an individual printhead by sliding the printhead along the cross-process axis of the media web. In this specific embodiment the printhead actuators are devices that physically move the printheads in the cross process direction. In alternative embodiments, an actuator system may be used that does not physically move the printheads, but redirects the image data to different ejectors in each head to change head position. Such an actuator system, however, can only reposition the printhead in increments of at least the cross process direction ejector to ejector spacing.

The printer may use "phase-change ink," by which is meant that the ink is substantially solid at room temperature and substantially liquid when heated to a phase change ink melting temperature for jetting onto the imaging receiving surface. The phase change ink melting temperature may be any temperature that is capable of melting solid phase change ink into liquid or molten form. In one embodiment, the phase change ink melting temperature is approximately 70° C. to 140° C. In alternative embodiments, the ink utilized in the imaging device may comprise UV curable gel ink. Gel ink may also be heated before being ejected by the inkjet ejectors of the printhead. As used herein, liquid ink refers to melted solid ink, heated gel ink, or other known forms of ink, such as aqueous inks, ink emulsions, ink suspensions, ink solutions, or the like.

Associated with each color unit is a backing member 24A-24D, typically in the form of a bar or roll, which is arranged substantially opposite the color unit on the back side of the media. Each backing member is used to position the media at a predetermined distance from the printheads opposite the backing member. Each backing member may be configured to emit thermal energy to heat the media to a predetermined temperature which, in one practical embodiment, is in a range of about 40° C. to about 60° C. The various backer members may be controlled individually or collectively. The pre-heater 18, the printheads, backing members 24 (if heated), as well as the surrounding air combine to maintain the media along the portion of the path opposite the printing station 20 in a predetermined temperature range of about 40° C. to 70° C.

As the partially-imaged media moves to receive inks of various colors from the printheads of the color units, the temperature of the media is maintained within a given range. Ink is ejected from the printheads at a temperature typically significantly higher than the receiving media temperature. Consequently, the ink heats the media. Therefore other temperature regulating devices may be employed to maintain the media temperature within a predetermined range. For example, the air temperature and air flow rate behind and in front of the media may also impact the media temperature. Accordingly, air blowers or fans may be utilized to facilitate control of the media temperature. Thus, the media temperature is kept substantially uniform for the jetting of all inks from the printheads of the color units. Temperature sensors (not shown) may be positioned along this portion of the media path to enable regulation of the media temperature. These temperature data may also be used by systems for measuring or inferring (from the image data, for example) how much ink of a given primary color from a printhead is being applied to the media at a given time.

Following the printing zone 20 along the media path are one or more "mid-heaters" 30. A mid-heater 30 may use contact, radiant, conductive, and/or convective heat to control a temperature of the media. The mid-heater 30 brings the ink placed on the media to a temperature suitable for desired properties when the ink on the media is sent through the spreader 40. In one embodiment, a useful range for a target temperature for the mid-heater is about 35° C. to about 80° C. The mid-heater 30 has the effect of equalizing the ink and substrate temperatures to within about 15° C. of each other. Lower ink temperature gives less line spread while higher ink temperature causes show-through (visibility of the image from the other side of the print). The mid-heater 30 adjusts substrate and ink temperatures to −10° C. to 20° C. above the temperature of the spreader.

Following the mid-heaters 30, a fixing assembly 40 is configured to apply heat and/or pressure to the media to fix the images to the media. The fixing assembly may include any suitable device or apparatus for fixing images to the media including heated or unheated pressure rollers, radiant heaters, heat lamps, and the like. In the embodiment of the FIG. 4, the fixing assembly includes a "spreader" 40, that applies a predetermined pressure, and in some implementations, heat, to the media. The function of the spreader 40 is to take what are essentially droplets, strings of droplets, or lines of ink on web W and smear them out by pressure and, in some systems, heat, so that spaces between adjacent drops are filled and image solids become uniform. In addition to spreading the ink, the spreader 40 may also improve image permanence by increasing ink layer cohesion and/or increasing the ink-web adhesion. The spreader 40 includes rollers, such as image-side roller 42 and pressure roller 44, to apply heat and pressure to the media. Either roll can include heat elements, such as heating elements 46, to bring the web W to a temperature in a range from about 35° C. to about 80° C. In alternative embodiments, the fixing assembly may be configured to spread the ink using non-contact heating (without pressure) of the media after the print zone. Such a non-contact fixing assembly may use any suitable type of heater to heat the media to a desired temperature, such as a radiant heater, UV heating lamps, and the like.

In one practical embodiment, the roller temperature in spreader 40 is maintained at a temperature to an optimum temperature that depends on the properties of the ink such as 55° C.; generally, a lower roller temperature gives less line spread while a higher temperature causes imperfections in the gloss. Roller temperatures that are too high may cause ink to offset to the roll. In one practical embodiment, the nip pressure is set in a range of about 500 to about 2000 psi. Lower nip pressure gives less line spread while higher pressure may reduce pressure roller life.

The spreader 40 may also include a cleaning/oiling station 48 associated with image-side roller 42. The station 48 cleans and/or applies a layer of some release agent or other material to the roller surface. The release agent material may be an amino silicone oil having viscosity of about 10-200 centipoises. Only small amounts of oil are required and the oil carried by the media is only about 1-10 mg per A4 size page. In one possible embodiment, the mid-heater 30 and spreader 40 may be combined into a single unit, with their respective functions occurring relative to the same portion of media simultaneously. In another embodiment the media is maintained at a high temperature as it is printed to enable spreading of the ink.

The coating station 95 applies a clear ink to the printed media. This clear ink helps protect the printed media from smearing or other environmental degradation following removal from the printer. The overlay of clear ink acts as a sacrificial layer of ink that may be smeared and/or offset during handling without affecting the appearance of the image underneath. The coating station 95 may apply the clear ink with either a roller or a printhead 98 ejecting the clear ink in a pattern. Clear ink for the purposes of this disclosure is functionally defined as a substantially clear overcoat ink or varnish that has minimal impact on the final printed color, regardless of whether or not the ink is devoid of all colorant. In one embodiment, the clear ink utilized for the coating ink comprises a phase change ink formulation without colorant. Alternatively, the clear ink coating may be formed using a reduced set of typical solid ink components or a single solid ink component, such as polyethylene wax, or polywax. As used herein, polywax refers to a family of relatively low molecular weight straight chain poly ethylene or poly methylene waxes. Similar to the colored phase change inks, clear phase change ink is substantially solid at room temperature and substantially liquid or melted when initially jetted onto the media. The clear phase change ink may be heated to about 100° C. to 140° C. to melt the solid ink for jetting onto the media.

Following passage through the spreader 40 the printed media may be wound onto a roller for removal from the system (simplex printing) or directed to the web inverter 84 for inversion and displacement to another printer or another section of the rollers for a second pass by the printheads, mid-heaters, spreader, and coating station. The duplex printed material may then be wound onto a roller for removal from the system by rewind unit 90. Alternatively, the media may be directed to other processing stations that perform tasks such as cutting, binding, collating, and/or stapling the media or the like.

Operation and control of the various subsystems, components and functions of the device 5 are performed with the aid of the controller 50. The controller 50 may be implemented with general or specialized programmable processors that execute programmed instructions. The instructions and data required to perform the programmed functions may be stored in memory associated with the processors or controllers. The processors, their memories, and interface circuitry configure the controllers and/or print engine to perform the functions, such as the processes for identifying printhead positions and compensation factors described above. These components may be provided on a printed circuit card or provided as a circuit in an application specific integrated circuit (ASIC) or a field programmable gate array (FPGA). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits. Controller 50 may be operatively coupled to the print bar and printhead actuators of color units 21A-21D in order to adjust the position of the print bars and printheads along the cross-process axis of the media web.

The imaging system 5 may also include an optical imaging system 54. The optical imaging system is configured to detect, for example, the presence, intensity, and/or location of ink drops jetted onto the receiving member by the inkjets of the printhead assembly. The optical imaging system may include an array of optical detectors mounted to a bar or other longitudinal structure that extends across the width of an imaging area on the image receiving member. In one embodiment in which the imaging area is approximately twenty inches wide in the cross process direction and the printheads print at a resolution of 600 dpi in the cross process direction, over 12,000 optical detectors are arrayed in a single row along the bar to generate a single scanline across the imaging member. The optical detectors are configured in association in one or more light sources that direct light towards the surface of the image receiving member. The optical detectors receive the light generated by the light sources after the light is reflected from the image receiving member. The magnitude of the electrical signal generated by an optical detector in response to light being reflected by the bare surface of the image receiving member is larger than the magnitude of a signal generated in response to light reflected from a drop of ink on the image receiving member. This difference in the magnitude of the generated signal may be used to identify the positions of ink drops on an image receiving member, such as a paper sheet, media web, or print drum. The reader should note, however, that lighter colored inks, such as yellow, cause optical detectors to generate lower contrast signals with respect to the signals received from unlinked portions than darker colored inks, such as black. Thus, the contrast may be used to differentiate between printed ink patterns and the image receiving member. The magnitudes of the electrical signals generated by the optical detectors may be converted to digital values by an appropriate analog/digital converter. These digital values are denoted as printed image data in this document. Other imaging devices or systems may also be used to generate printed image data.

In the illustrated system of FIG. 4, a color unit includes a plurality of printheads for printing full color images comprised of the colors cyan, magenta, yellow, and black. For example, a color unit may have eight printheads, two for each color of ink supplied by the solid ink supply 24. Each printhead has a predetermined inkjet density, which may be, for example, 300 dots per inch (dpi). The two or more printheads for a particular color may be serially arranged, which means that some of the printheads are located downstream in the direction of web movement from the other printheads that eject the same color of ink. The downstream printheads may be offset from the upstream printheads by an integral number plus zero to one-half of the inkjet spacing on a printhead. Thus, the serially arranged printheads enable one or more rows, depending upon the number of inkjet rows in the printheads, to be printed with a density that is twice the density of each single printhead. For example, two 300 dpi printheads offset by a distance of one-half of an inkjet width enable rows of 600 dpi to be printed, though the printheads need not be aligned to an integral number plus one-half of the inkjet spacing either by intention or by misalignment.

In order to form an image with the ink ejected by printheads in the system 5, input image data are rendered into output image values that are used to generate firing signals that selectively actuate the inkjets in the printheads to eject ink onto the web as it moves past the printhead assembly. Typically, digital image data are received by the system 5. These digital image data may include an image for each color to be printed in the image. The input image data for a single color is called a color separation for the overall image. Each datum in a color separation corresponds to an input image value for a particular location in the color separation. The processing of the input image values is typically performed by a marking engine, which is controlled by a processor executing instructions stored in a memory operatively coupled to the processor.

The processor for the marking engine may be implemented with one or more processors, one of which may be configured to perform the defective inkjet compensation method described below. The processor may be a general purpose processor having an associated memory in which programmed instructions are stored. Execution of the programmed instructions enables the processor to process the input image values to detect edges and adjust output image values at areas away from the detected edges. The processor may, alternatively, be an application specific integrated circuit or a group of electronic components configured on a printed circuit. Thus, the processor may be implemented in hardware alone, software alone, or a combination of hardware and software. In one embodiment, the processor for the marking engine comprises a self-contained, microcomputer having a central processor unit (not shown) and electronic storage (not shown). The electronic storage may be a non-volatile memory, such as a read only memory (ROM) or a programmable non-volatile memory, such as an EEPROM or flash memory. The image data source may be any one of a number of different sources, such as a scanner, a digital copier, a facsimile device, etc. Once the input image values have been used by the printhead controller to generate firing signals for the inkjets in the printheads of the printhead assembly, drops of ink are ejected onto the moving web to form a printed image.

Figures 2, 3:
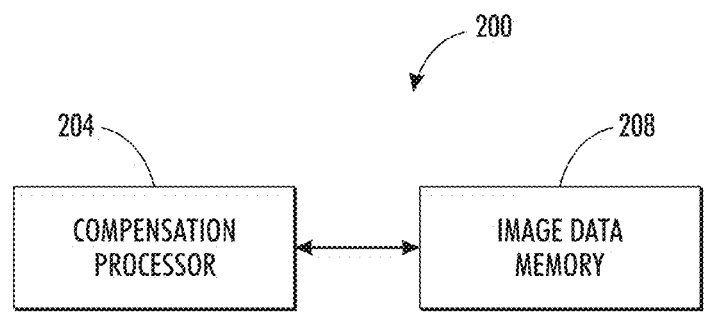
FIG. 2 is a block diagram of a system that detects edges in image data and increases the image data values corresponding to an edge to a data value that better preserves the edges when the image data is printed.
FIG. 3 illustrates the differences between an original image, a dithered image, and a dithered image with increased data values at the image data values corresponding to edges to preserve edges.

A block diagram of a system that processes image data to preserve edges is shown in FIG. 2. The system 200 includes an image data memory 208 in which image data values are stored. These image data values have already been processed by the processor 204 to dither the image data values. That is, all of the image data values in the memory 208 are less than 100 percent of the maximum ink drop mass possible with the inkjet ejectors in the printheads of the printing system. The image data values stored in the memory 208 are further processed by the processor 204, which is configured to implement the process described below to search the image data and preserve edges in the memory. Configuration of the processor refers to a combination of programming instructions, hardware components, and related circuitry that enable a task to be performed.

A process that preserves edges in image data while enabling dithering elsewhere within an image object is shown in FIG. 1. The process 100 begins by detecting edges in image data stored in an image data array (block 104). As used in this document, an "edge" is an image data value or multiple image data values in the process direction that are significantly different than nearby image data values, at least in one direction. Numerous distinguishing features may be used to detect edges within or for an image. For example, some edges transition from dark to light and/or vice versa. These transitions may occur in any of a number of directions, e.g., vertical, horizontal, or both directions. Edges may also occur in one particular color plane of a color separated image. Thus, different types of edges may be detected and classified accordingly. For example, edges may be classified according to a spatial direction (vertical, horizontal, etc.), a color plane, an intensity direction (light to dark), or a spatial direction in a color plane, to name a few possible classifications. In one embodiment, edge detection may be implemented by passing all the image data values stored in the memory 208 through a known edge filter and then comparing the filtered values to a predetermined threshold. An edge pixel is detected in response to a filtered image data value being greater than the predetermined threshold. The threshold comparison helps prevent small transitions and noise from being identified as edges. Edge detection techniques are well-known in the art and they may be used to detect edges in the dithered image data or in binary image data. Binary image data may be derived from image data by comparing the image data to a threshold value in a threshold array and assigning a bit value of either 1 or 0 to an image data position in response to a comparison of the image data at a storage location to the threshold value. This processing enables only edges with large amounts of contrast to be detected. This edge detection processing may be performed on each color separation plane or it may be performed in a composite color or contone image.

Once the image edges have been detected, the process 100 continues by evaluating whether to dither the image data values that do not correspond to the detected edges (block 108). In this manner, the original image data values for the detected edges are used to generate firing signals for operating the printheads, but dithering of other image data values may occur to address other issues, such as missing, intermittent, and weak jets, for example. If image data values are to be dithered, then the image data values are reduced to an appropriate dither value by a known method (block 112). For example, in one embodiment, the non-edge image values are compared to a predetermined image data threshold. If the non-edge value is less than the predetermined threshold, the image data value is not modified. In the embodiment, if the non-edge value corresponds to 100% of the maximum ink drop mass, then the image data value is reduced to 80% of the maximum ink drop mass. For image data values equal to or greater than the predetermined threshold, but less than 100% of the maximum ink drop mass, the image data value is reduced with reference to a linear interpolation between the 80% of the maximum ink drop mass and the percentage that corresponds to the predetermined threshold. Once all of the image data values have been evaluated and dithered, if appropriate (block 116), firing signals are generated with reference to the image data values stored in the memory (block 120). The printheads are then operated with the generated firing signals (block 124).

In the method shown in FIG. 1, the number of image data values associated with a detected edge need not be the same on either side of a detected edge. For example, only one image data value preceding an identified edge image data value may be excluded from the dithering evaluation while two or more image data values following in the process direction may be excluded from the dithering evaluation. Similarly, one or more image data values on either side of a detected edge image data value in the cross-process direction may be excluded from the dithering evaluation. This image data value preservation in the cross-process direction need not be symmetrical.

FIG. 3 depicts an original printed image on the left and a dithered image in the center. After the dithered image data has been processed with an embodiment of the method described above, the edge preserved dithered image that was printed is shown on the right. The reader may compare these images to see the contrast presented at the edges of the image on the right while preserving the dithered image appearance in the interior of the image objects depicted in the rightmost image.

The methods disclosed herein may be implemented by a processor being configured with instructions and related circuitry to perform the methods. Additionally, processor instructions may be stored on computer readable medium so they may accessed and executed by a computer processor to perform the methods for distributing compensation image values to image data positions located around an image data position corresponding to a defective inkjet. The computer readable medium may be, for example, a hard drive, non-volatile memory operatively connected to the processor, or the like.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for processing image data to preserve edges comprising:
    identifying edge image data values in a plurality of image data values stored in a memory, the image data values stored in the memory are less than 100 percent of a maximum ink drop mass that can be ejected by inkjet ejectors in at least one printhead;
    excluding the identified edge image data values from dithering of the image data values stored in the memory;
    excluding image data values not identified as edge image data values from dithering, the excluded image data values not identified as edge image data values having a predetermined relationship to at least one edge image data value;
    dithering at least one image data value stored in the memory that was not excluded from dithering by determining whether to modify the at least one image data value that was not excluded with reference to a threshold and a predetermined percentage of the maximum drop mass, the threshold being greater than zero, but less than the predetermined percentage of the maximum ink drop mass;
    generating firing signals corresponding to the image data values stored in the memory; and
    operating the at least one printhead with the generated firing signals.

2. The method of claim 1 further comprising:
    modifying the at least one image data value stored in the memory that was not excluded from dithering with reference to a linear interpolation between a percentage of the maximum ink drop mass corresponding to the threshold and 80% of the maximum ink drop mass in response to the at least one image data value stored in the memory that was not excluded from dithering being equal to or greater than the threshold, but less than an image data value corresponding to 100% of the maximum ink drop mass.

3. The method of claim 1, the exclusion of non-edge image data values from dithering further comprising:
    excluding non-edge image data values that follow an identified edge image data value in a process direction.

4. The method of claim 1, the exclusion of non-edge image data values from dithering further comprising:
    excluding non-edge image data values that are on either side of an identified edge image data value in a cross-process direction.

5. The method of claim 1, the exclusion of non-edge image data values from dithering further comprising:
    excluding non-edge image data values that precede an identified edge image data value in a process direction.

6. The method of claim 1, the identification of the edge image data values further comprising:
    filtering the image data values stored in the memory; and
    comparing the filtered image data values to a predetermined threshold to identify the edge image data values.

7. The method of claim 1 wherein the image data values stored in the memory are contone image data values.

8. A system for image correction to compensate for a defective inkjet in at least one printhead comprising:
    an image data memory having a plurality of locations in which image data values are stored, the image data values stored in the memory are less than 100 percent of a maximum ink drop mass that can be ejected by inkjet ejectors in the at least one printhead; and
    a processor configured to identify edge image data values in a plurality of image data values stored in the image data memory, to exclude the identified edge image data values from dithering of the image data values stored in the image data memory, to exclude image data values not identified as edge image data values from dithering, the excluded image data values not identified as edge image data values having a predetermined relationship with at least one edge image data value, to dither at least one image data value stored in the memory that was not excluded from dithering by determining whether to modify the at least one image data value that was not excluded with reference to a threshold and a predetermined percentage of a maximum drop mass, the threshold being greater than zero, but less than the predetermined percentage of the maximum ink drop mass, to generate firing signals corresponding to the image data values stored in the image data memory, and to operate the at least one printhead with the generated firing signals.

9. The system of claim 8, the processor being further configured to modify the at least one image data value stored in the memory that was not excluded from dithering with reference to a linear interpolation between a percentage of the maximum ink drop mass corresponding to the threshold and 80% of the maximum ink drop mass in response to the at least one image data value stored in the memory that was not excluded from dithering ink drop mass being equal to or greater than the threshold, but less than an image data value corresponding to 100% of the maximum ink drop mass.

10. The system of claim 8, the processor being further configured to exclude non-edge image data values that follow an identified edge image data value in a process direction.

11. The system of claim 8, the processor being further configured to exclude non-edge image data values that are on either side of an identified edge image data value in a cross-process direction.

12. The system of claim 8, the processor being further configured to exclude non-edge image data values preceding an identified edge image data value in a process direction.

13. The system of claim 10 the processor being further configured to filter the image data values stored in the image data memory, and to compare the filtered image data values to a predetermined threshold to identify the edge image data values.

14. The system of claim 8 wherein the image data values stored in the image data memory are contone image data values.

* * * * *